US009058918B2

(12) United States Patent
Caronia et al.

(10) Patent No.: US 9,058,918 B2

(45) Date of Patent: Jun. 16, 2015

(54) METHOD FOR PRODUCING WATER TREE-RESISTANT, TRXLPE-TYPE CABLE SHEATH

(75) Inventors: Paul J. Caronia, Annadale, NJ (US); Robert F. Eaton, Belle Mead, NJ (US); Jeffrey M. Cogen, Flemington, NJ (US); Laurence H. Gross, Bridgewater, NJ (US); Timothy J. Person, Freehold, NJ (US); Alfred Mendelsohn, Brooklyn, NY (US); Scott H. Wasserman, Morganville, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 625 days.

(21) Appl. No.: 12/993,287

(22) PCT Filed: May 18, 2009

(86) PCT No.: PCT/US2009/044329

§ 371 (c)(1), (2), (4) Date: Nov. 18, 2010

(87) PCT Pub. No.: WO2009/148811

PCT Pub. Date: Dec. 10, 2009

(65) Prior Publication Data

US 2011/0094772 A1 Apr. 28, 2011

Related U.S. Application Data

(60) Provisional application No. 61/059,018, filed on Jun. 5, 2008.

(51) Int. Cl.

| | |
|---|---|
| ***B29D 11/00*** | (2006.01) |
| ***B29C 47/06*** | (2006.01) |
| ***H01B 7/282*** | (2006.01) |
| ***H01B 13/14*** | (2006.01) |

(52) U.S. Cl.

CPC .............. *H01B 7/282* (2013.01); *H01B 13/148* (2013.01)

(58) Field of Classification Search

USPC ............. 264/1.1, 1.28, 1.29, 171.13, 171.14, 264/349; 174/137 B

IPC ................. B29C 47/025,47/06, 47/1063; B29D 11/00663; H01B 7/282, 13/148

See application file for complete search history.

(56) References Cited

U.S. PATENT DOCUMENTS

| | | | | |
|---|---|---|---|---|
| 3,499,791 | A | 3/1970 | Maloney | |
| 3,795,646 | A | 3/1974 | Mackenzie et al. | |
| 3,956,420 | A | 5/1976 | Kato et al. | |
| 4,018,852 | A | 4/1977 | Schober | |
| 4,144,202 | A | 3/1979 | Ashcraft et al. | |
| 4,206,260 | A | 6/1980 | McMahon | |
| 4,212,756 | A | 7/1980 | Ashcraft et al. | |
| 4,263,158 | A | 4/1981 | Ashcraft et al. | |
| 4,299,713 | A | 11/1981 | Maringer et al. | |
| 4,440,671 | A | 4/1984 | Turbett | |
| 4,857,600 | A | 8/1989 | Gross et al. | |
| 4,870,121 | A | 9/1989 | Bamji et al. | |
| 4,877,840 | A * | 10/1989 | Chu | 525/240 |
| 5,034,278 | A | 7/1991 | Turbett | |
| 5,064,802 | A | 11/1991 | Stevens et al. | |
| 5,246,783 | A | 9/1993 | Spenadel et al. | |
| 5,272,236 | A | 12/1993 | Lai et al. | |
| 5,278,272 | A | 1/1994 | Lai et al. | |
| 5,346,961 | A | 9/1994 | Shaw et al. | |
| 5,575,965 | A | 11/1996 | Caronia et al. | |
| 5,687,271 | A | 11/1997 | Rabinowitz | |
| 5,986,028 | A | 11/1999 | Lai et al. | |
| 2003/0045617 | A1 * | 3/2003 | Caronia et al. | 524/330 |

FOREIGN PATENT DOCUMENTS

| | | | |
|---|---|---|---|
| EP | 0023239 | A2 | 2/1981 |
| EP | 0837476 | A2 | 4/1998 |
| EP | 0966003 | A1 | 12/1999 |
| EP | 1132428 | A2 | 9/2001 |
| EP | 1148518 | A1 | 10/2001 |
| JP | S51-149576 | A | 12/1976 |
| WO | 9319104 | A1 | 9/1993 |
| WO | 9500526 | A1 | 1/1995 |
| WO | 9514024 | A1 | 5/1995 |
| WO | 9849212 | A1 | 11/1998 |
| WO | 00/08655 | A1 | 2/2000 |
| WO | 2006089793 | A1 | 8/2006 |

* cited by examiner

*Primary Examiner* — Mathieu Vargot

(74) *Attorney, Agent, or Firm* — Whyte Hirschboeck Dudek S.C.

(57) ABSTRACT

TRXLPE-type cable sheaths are prepared by a method in which a solid polymer is mixed with a liquid water tree-resistant agent either by dosing or direct injection. In the dosing method, the solid polymer, e.g., high pressure LDPE, is sprayed or otherwise contacted with the liquid agent, e.g., PEG, the agent is allowed to absorb into the polymer, and the polymer with absorbed agent is then fed to an extrusion apparatus for extrusion over a sheathed or unsheathed wire or optic fiber. In the direct injection method, the solid polymer is first fed to an extrusion apparatus, and the liquid agent is sprayed or otherwise contacted with the polymer before the two are blended with one another through the action of the mixing elements of the apparatus.

18 Claims, No Drawings

METHOD FOR PRODUCING WATER TREE-RESISTANT, TRXLPE-TYPE CABLE SHEATH

CROSS REFERENCE TO RELATED APPLICATION

The present application claims priority to U.S. patent application Ser. No. 61/059,018, filed on Jun. 5, 2008, the entire content of which is incorporated by reference herein.

FIELD OF THE INVENTION

This invention relates to cable sheaths. In one aspect, the invention relates to tree-resistant cable insulation and protective jackets while in another aspect, the invention relates to tree-resistant, crosslinked polyolefin, particularly polyethylene (TRXLPE), cable sheaths. In still another aspect, the invention relates to a dosing method of producing TRXLPE-type cable sheaths while yet in another aspect, the invention relates to a direct injection method of producing TRXLPE-type cable sheaths.

BACKGROUND OF THE INVENTION

Many polymeric materials have been utilized as electrical insulating and semiconducting shield materials for power cables and other numerous applications. In order to be utilized in services or products where long term performance is desired or required, such polymeric materials, in addition to having suitable dielectric properties, must also be enduring and must substantially retain their initial properties for effective and safe performance over many years of service. For example, polymeric insulations utilized in building wire, electrical motor or machinery power wires, or underground power transmitting cables, must be enduring not only for safety but also out of economic necessity and practicality.

One major type of failure that polymeric cable sheaths can undergo is the phenomenon known as treeing. Treeing generally progresses through a dielectric section under electrical stress so that, if visible, its path looks something like a tree. Treeing may occur and progress slowly by periodic partial discharge, it may occur slowly in the presence of moisture without any partial discharge, or it may occur rapidly as the result of an impulse voltage. Trees may form at the site of a high electrical stress such as contaminants or voids in the body of the insulation-semiconductive screen interface.

Electrical treeing results from internal electrical discharges which decompose the dielectric. Although high voltage impulses can produce electrical trees, and the presence of internal voids and contaminants is undesirable, the damage which results from application of moderate A/C voltages to electrode/insulation interfaces which contain imperfections is more commercially significant. In this case, very high, localized stress gradients can exist and with sufficient time lead to initiation and growth of trees which may be followed by breakdown.

In contrast to electrical treeing, water treeing is the deterioration of a solid dielectric material which is simultaneously exposed to moisture and an electric field. It is a significant factor in determining the useful life of buried power cables. Water trees initiate from sites of high electrical stress such as rough interfaces, protruding conductive points, voids, or imbedded contaminants but at a lower field than that required for electrical trees. In contrast to electrical trees, water trees are characterized by: (a) the presence of water is essential for their growth; (b) they can grow for years before reaching a size where they may contribute to a breakdown; and (c) although slow growing they are initiated and grow in much lower electrical fields than those required for the development of electrical trees.

Electrical insulation applications are generally divided into low voltage insulation which are those less than 5K volts, medium voltage insulation which ranges from 5K volts to 60K volts, and high voltage insulation, which is for applications above 60K volts. In low voltage applications, electrical treeing is generally not a pervasive problem and is far less common than water treeing, which frequently is a problem.

For medium voltage applications, the most common polymeric insulators are made from a polyolefin, typically either from polyethylene or ethylene-propylene elastomers, otherwise known as ethylene-propylene-rubber (EPR). The polyethylene can be any one or more of a number of various polyethylenes, e.g., homopolymer, high density polyethylene (HDPE), high pressure low density polyethylene (LDPE), linear low density polyethylene (LLDPE), and the like. The polyethylenes are typically crosslinked, usually through the action of a peroxide, but are still prone to treeing, particularly water treeing.

To counter-act this proneness to water treeing, the polymer is typically treated with a water tree-resistant agent, e.g., if the polymer is polyethylene, a typical water tree-resistant agent is polyethylene glycol. Other water tree-resistant agents are described in U.S. Pat. Nos. 4,144,202, 4,212,756, 4,263,158, 4,376,180, 4,440,671 and 5,034,278 and include, but are not limited to, organo-silanes including epoxy- or azomethine-containing organo-silanes, N-phenyl substituted amino silanes, and hydrocarbon-substituted diphenyl amines. These agents are usually mixed with the polymer before a crosslinking agent is added and before the polymer is extruded onto a cable. This mixing is typically performed as a melt blend of polymer and agent from which a pellet or other shape is formed. These blend techniques, however, are capital and/or time intensive and if the polymer is solid and the agent is liquid, do not always produce a uniform dispersion of the agent in the polymer.

BRIEF SUMMARY OF THE INVENTION

In one embodiment of this invention, a dosing method is used for preparing a tree-resistant cable sheath. The method blends a water tree-resistant agent with a polymeric compound, and it comprises the steps of:

A. Contacting a liquid tree-resistant agent with a solid polymer outside an extrusion apparatus and at a temperature between 25° C. and 100° C., B. Allowing the agent to absorb into the solid polymer, C. Transferring the solid polymer with the absorbed agent to an extrusion apparatus, and D. Extruding the polymer with absorbed agent onto a sheathed or unsheathed wire or optic fiber.

The polymeric compound, typically a polyolefin and especially a polyethylene, in pellet or similar solid form is sprayed or otherwise contacted with a liquid tree-resistant agent such that at least a part of the agent is absorbed into the polymeric compound. The agent is either liquid at room temperature, e.g., 23° C., or if solid at room temperature, is heated to a temperature at which it is liquid prior to its application to the solid polymer. The polymeric compound with the absorbed tree-resistant agent is then fed to an extrusion apparatus from which it is extruded as a sheath over a cable.

In another embodiment, the invention is a direct injection method for preparing a tree-resistant cable sheath. This method also blends a tree-resistant agent with a polymeric compound, and it comprises the steps of:

A. Feeding a solid polymer to an extrusion apparatus,

B. Contacting the polymer with a liquid tree-resistant agent before the solid polymer is melted, C. Blending the polymer and the agent within the extrusion apparatus, and D. Extruding the polymer with blended agent onto a sheathed or unsheathed wire or optic fiber.

In this embodiment, the polymeric compound is fed to an extruder or similar apparatus and mixed with a liquid tree-resistant agent either prior to, simultaneously with or subsequent to melting of the polymeric compound. The polymeric compound and tree resistant agent are mixed to form a substantially homogeneous blend, and then the blend is extruded as a sheath over a cable.

In one embodiment, the water tree-resistant agent is added to the polymer in the form of a masterbatch, i.e., as a concentrate comprising a high percentage of agent (relative to the target amount of agent in the polymer at the time the polymer is extruded over a cable) dissolved or otherwise dispersed within the polymer. In this embodiment, the method comprises the steps of:

A. Forming a masterbatch comprising a solid polymer and a water tree-resistant agent, B. Feeding the solid polymer of (A) and the masterbatch to an extrusion apparatus, C. Melt blending the solid polymer and the masterbatch within the extruder such that the agent in the masterbatch is at least substantially dispersed throughout the solid polymer, and D. Extruding the polymer with blended agent onto a sheathed or unsheathed wire or optic fiber.

DETAILED DESCRIPTION OF THE PREFERRED EMBODIMENT

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc., one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of tree-resistant agent relative to the polymer, process conditions, additive amounts and molecular weights.

"Cable," "power cable," and like terms mean at least one wire or optical fiber within a protective jacket or sheath. Typically, a cable is two or more wires or optical fibers hound together, typically in a common protective jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Polymer" means a polymeric compound prepared by polymerizing monomers, whether of the same or a different type. The generic term polymer thus embraces the term homopolymer, usually employed to refer to polymers prepared from only one type of monomer, and the term copolymer as defined below.

"Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Polyolefin", "PO" and like terms mean a polymer derived from simple olefins. Many polyolefins are thermoplastic and for purposes of this invention, can include a rubber phase. Representative polyolefins include polyethylene, polypropylene, polybutene, polyisoprene and their various interpolymers.

"Blend," "polymer blend" and like terms mean a mixture of two or more materials, e.g., two or more polymers, at least one polymer and at least one water tree-resistant agent, etc. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Water tree-resistant agent" and like terms means a substance that will impart water-treeing resistance to a polymer when incorporated into the polymer. ASTM D-6097-97 is a test for water treeing, and an acceptable tree resistant agent is identified as one that reduces water tree size by 25, preferably 50 and more preferably 75, percent relative to a test specimen without a water tree-resistant agent. Representative conditions include 23° C. and 0.01M salt (NaCl) solution over 90 days. The amount of agent incorporated into the polymer to effect the water tree resistance will vary with the polymer and agent, but is at least 0.0001 weight percent (wt %) based on the weight of the polymer.

Polyolefins

The polymers used in the practice of this invention are preferably polyolefins, and these can be produced using conventional polyolefin polymerization technology, e.g., Ziegler-Natta, high-pressure, metallocene or constrained geometry catalysis. The polyolefins can be produced using a mono- or bis-cyclopentadienyl, indenyl, or fluorenyl transition metal (preferably Group 4) catalyst or constrained geometry catalysts (CGC) in combination with an activator, in a solution, slurry, or gas phase polymerization process. Preferably, the polyolefin is a low density polyethylene made under high pressure and free radical polymerization conditions. Polyolefins prepared with mono-cyclopentadienyl, mono-indenyl or mono-fluorenyl CGC can also be used in the practice of this invention. U.S. Pat. No. 5,064,802, WO93/19104 and WO95/00526 disclose constrained geometry metal complexes and methods for their preparation. Variously substituted indenyl containing metal complexes are taught in WO95/14024 and WO98/49212. The form or shape of the polymer can vary to convenience, e.g., pellet, granule and powder.

In general, polymerization can be accomplished at conditions well known in the art for Ziegler-Natta or Kaminsky-Sinn type polymerization reactions, that is, at temperatures from 0-250° C., preferably 30-200° C., and pressures from atmospheric to 10,000 atmospheres (1013 megaPascal (MPa)). Suspension, solution, slurry, gas phase, solid state powder polymerization or other process conditions may be employed if desired. The catalyst can be supported or unsupported, and the composition of the support can vary widely. Silica, alumina or a polymer (especially poly(tetrafluoroethylene) or a polyolefin) are representative supports, and desirably a support is employed when the catalyst is used in a gas phase polymerization process. The support is preferably employed in an amount sufficient to provide a weight ratio of catalyst (based on metal) to support within a range of from 1:100,000 to 1:10, more preferably from 1:50,000 to 1:20, and most preferably from 1:10,000 to 1:30. In most polymerization reactions, the molar ratio of catalyst to polymerizable compounds employed is from $10^{-12}$:1 to $10^{-1}$:1, more preferably from $10^{-9}$:1 to $10^{-5}$:1.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene.

Polyolefins for medium (5 to 60 kv) and high voltage (>60 kv) insulation are made at high pressure in reactors that are often tubular or autoclave in physical design. The polyolefin polymer can comprise at least one resin or its blends having melt index (MI, $I_2$) from 0.1 to about 50 grams per 10 minutes (g/1.0 min) and a density between 0.85 and 0.95 grams per cubic centimeter (glee). The preferred polyolefins are polyethylene with a MI of 1.0 to 5.0 g/10 min and a density of 0.918 to 0.928 g/cc. Typical polyolefins include high pressure low density polyethylene (HPLDPE), high density polyethylene (HDPE), linear low density polyethylene (LLDPE), metallocene linear low density polyethylene, and constrained geometer catalyst (CGC) ethylene polymers. Density is measured by the procedure of ASTM D-792 and melt index is measured by ASTM D-1238 (190 C/2.16 kg).

In another embodiment, the polyolefin polymer includes but is not limited to copolymers of ethylene and unsaturated esters with an ester content of at least about 5 wt % based on the weight of the copolymer. The ester content s often as high as 80 wt %, and, at these levels, the primary monomer is the ester.

In still another embodiment, the range of ester content is 10 to about 40 wt %. The percent by weight is based on the total weight of the copolymer. Examples of the unsaturated esters are vinyl esters and acrylic and methacrylic acid esters. The ethylene/unsaturated ester copolymers usually are made by conventional high pressure processes. The copolymers can have a density in the range of about 0.900 to 0.990 g/cc. In yet another embodiment, the copolymers have a density in the range of 0.920 to 0.950 g/cc. The copolymers can also have a melt index in the range of about 1 to about 100 g/10 min. In still another embodiment, the copolymers can have a melt index in the range of about 5 to about 50 g/10 min.

The ester can have 4 to about 20 carbon atoms, preferably 4 to about 7 carbon atoms. Examples of vinyl esters are: vinyl acetate; vinyl butyrate; vinyl pivalate; vinyl neononanoate; vinyl neodecanoate; and vinyl 2-ethylhexanoate. Examples of acrylic and methacrylic acid esters are: methyl acrylate; ethyl acrylate; t-butyl acrylate; n-butyl acrylate; isopropyl acrylate; hexyl acrylate; decyl acrylate; lauryl acrylate; 2-ethylhexyl acrylate; lauryl methacrylate; myristyl methacrylate; palmityl methacrylate; stearyl methacrylate; 3-methacryloxy-propyltrimethoxy silane; 3-methacryloxypropyltriethoxysilane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; isooctyl methacrylate; and oleyl methacrylate. Methyl acrylate, ethyl acrylate, and n- or t-butyl acrylate are preferred. In the case of alkyl acrylates and methacrylates, the alkyl group can have 1 to about 8 carbon atoms, and preferably has 1 to 4 carbon atoms. The alkyl group can be substituted with an oxyalkyltrialkoxysilane.

Other examples of polyolefin polymers are: polypropylene; polypropylene copolymers; polybutene; polybutene copolymers; highly short chain branched α-olefin copolymers with ethylene co-monomer less than about 50 mole percent but greater than 0 mole percent; polyisoprene; polybutadiene; EPR (ethylene copolymerized with propylene); EPDM (ethylene copolymerized with propylene and a diene such as hexadiene, dicyclopentadiene, or ethylidene norbornene); copolymers of ethylene and an α-olefin having 3 to 20 carbon atoms such as ethylene/octene copolymers; terpolymers of ethylene, α-olefin, and a diene (preferably non-conjugated); terpolymers of ethylene, α-olefin, and an unsaturated ester; copolymers of ethylene and vinyl-tri-alkyloxy silane; terpolymers of ethylene, vinyl-tri-alkyloxy silane and an unsaturated ester; or copolymers of ethylene and one or more of acrylonitrile or maleic acid esters.

The polyolefin polymer of the present invention also includes ethylene ethyl acrylate, ethylene vinyl acetate, vinyl ether, ethylene vinyl ether, methyl vinyl ether, and silane interpolymers. One example of commercially available ethylene ethyl acrylate (EEA) is AMPLIFY from The Dow Chemical Company. One example of commercially available ethylene vinyl acetate (EVA) is DuPont™ ELVAX® EVA resins from E. I. du Pont de Nemours and Company.

The polyolefin polymer of the present invention includes but is not limited to a polypropylene copolymer comprising at least about 50 mole percent (mol %) units derived from propylene and the remainder from units from at least one α-olefin having up to about 20, preferably up to 12 and more preferably up to 8, carbon atoms, and a polyethylene copolymer comprising at least 50 mol % units derived from ethylene and the remainder from units derived from at least one α-olefin having up to about 20, preferably up to 12 and more preferably up to 8, carbon atoms.

The polyolefin copolymers useful in the practice of this invention include ethylene/α-olefin interpolymers having a α-olefin content of between about 15, preferably at least about 20 and even more preferably at least about 25, wt % based on the weight of the interpolymer. These interpolymers typically have an α-olefin content of less than about 50, preferably less than about 45, more preferably less than about 40 and even more preferably less than about 35, wt % based on the weight of the interpolymer. The α-olefin content is measured by $^{13}C$ nuclear magnetic resonance (NMR) spectroscopy using the procedure described in Randall (*Rev. Macromol. Chem. Phys., C*29 (2&3)). Generally, the greater the α-olefin content of the interpolymer, the lower the density and the more amorphous the interpolymer, and this translates into desirable physical and chemical properties for the protective insulation layer.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

The polyolefins used in the practice of this invention can be used alone or in combination with one or more other polyolefins, e.g., a blend of two or more polyolefin polymers that differ from one another by monomer composition and content, catalytic method of preparation, etc. If the polyolefin is a blend of two or more polyolefins, then the polyolefin can be blended by any in-reactor or post-reactor process. The in-reactor blending processes are preferred to the post-reactor blending processes, and the processes using multiple reactors connected in series are the preferred in-reactor blending processes. These reactors can be charged with the same catalyst but operated at different conditions, e.g., different reactant concentrations, temperatures, pressures, etc, or operated at the same conditions but charged with different catalysts. The polymers and blends used in the practice of this invention typically have a density from 0.86 to 0.935 g/cc.

Examples of olefinic interpolymers useful in the practice of this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), and homogeneously branched, substantially linear ethylene/α-olefin polymers (e.g., AFFINITY® and ENGAGE® polyethylene available from The Dow Chemical Company). The substantially linear ethylene copolymers are more fully described in U.S. Pat. Nos. 5,272,236, 5,278,272 and 5,986,028. HPLDPE is a particularly preferred polyolefin for use in this invention.

Exemplary polypropylenes useful in the practice of this invention include the VERSIFY® polymers available from The Dow Chemical Company, and the VISTAMAXX® polymers available from ExxonMobil Chemical Company. A complete discussion of various polypropylene polymers is contained in *Modern Plastics Encyclopedia*/89, mid October 1988 Issue, Volume 65, Number 11, pp. 6-92.

The polymers utilized in the present may be crosslinked chemically or with radiation. Suitable crosslinking agents include free radical initiators, preferably organic peroxides, more preferably those with one hour half lives at temperatures greater than 120° C. Examples of useful organic peroxides include 1,1-di-t-butyl peroxy-3,3,5-trimethylcyclohexane, dicumyl peroxide, 2,5-dimethyl-2,5-di(t-butyl peroxy) hexane, t-butyl-cumyl peroxide, di-t-butyl peroxide, and 2,5-dimethyl-2,5-di-(t-butyl peroxy) hexyne. Dicumyl peroxide is the preferred crosslinking agent. Additional teachings regarding organic peroxide crosslinking agents are available in the Handbook of Polymer Foams and Technology, pp. 198-204, supra. The peroxide can be added to the polymer by any one of a number of different techniques including, but not limited to, addition of the peroxide directly to the extruder from which the polymer is ultimately extruded upon the cable, or absorbed into the solid polymer outside of the extruder either alone or in combination with one or more other additives, including the water-tree resistant agent.

Free radical crosslinking initiation via electron beam, or beta-ray, gamma-ray, x-ray or neutron rays may also be employed. Radiation is believed to affect crosslinking by generating polymer radicals, which may combine and crosslink. The Handbook of Polymer Foams and Technology, supra, at pp. 198-204, provides additional teachings.

Tree-Resistant Agents

Any compound that will inhibit the formation of water treeing in the crosslinked polyolefin under its end-use conditions can be used as the water tree-resistant agent of this invention. For soaking or diffusing into the polyolefin, a low melting point, e.g., less than 70° C., preferably less than 50° C. and more preferably less than 35° C., water tree-resistant agent is preferred. Additionally, a eutectic mixture of a high molecular weight, e.g., not more than 1,000,000, preferably not more than 100,000 and more preferably not more than 50,000, weight average molar mass gram per mole (g/mol) that is a solid at 23° C. and a low molecular weight, e.g., less than 2,000, preferably less than 1,000 and more preferably less than 500, g/mol that is liquid at 23° C. can be used. Representative water tree-resistant agents include an alcohol of 6 to 24 carbon atoms (U.S. Pat. No. 4,206,260), an organo-silane, e.g., a silane containing an epoxy-containing radical, (U.S. Pat. No. 4,144,202), an inorganic ionic salt of a strong acid and a strong Zwitter-ion compound (U.S. Pat. No. 3,499,791), a ferrocene compound and a substitute quinoline compound (U.S. Pat. No. 3,956,420), a polyhydric alcohol, and a silicone fluid (U.S. Pat. No. 3,795,646). The polyglycols are a preferred class of water tree-resistant agents. Polyethylene glycol (PEG) with a weight average molar mass of less than 2,000, preferably less than 1,200 and more preferably less than 800, is a particularly preferred tree-resistant agent, particularly for use with polyethylene, especially with LDPE. Vinyl end-capped PEG is a particularly preferred tree-resistant agent.

The molecular weight of the PEG can be increased in either the extruder or during post cable processing. This can be accomplished through the reaction of any one of an acrylic, methacrylic, itaconic or related acid with mono- or dihydroxy functional ethylene oxide oligomers or polymers. Additionally, ethylene oxide copolymers with other epoxy functional monomers can be used. Alternatively, hydroxy functional vinyl monomers like hydroxyethyl acrylate (HEA) and hydroxyethyl methacrylate (HEMA) and the like can be used to initiate ethylene oxide polymerization or copolymerization. Still another alternative method is the transesterification of a vinyl or related unsaturated ester, e.g., methylacrylate, methyl methacrylate, etc., with a hydroxy functional ethylene oxide polymer or copolymer to make a vinyl terminated agent.

High molecular weight water tree-resistant agents that are solid at 23° C. can be introduced into the polymer, e.g., LDPE, by pre-compounding the agent into a polymer masterbatch which is then pelletized. The pellets can then be added directly to the polymer in the extruder to facilitate the incorporation of the agent while reducing the impact on extrusion efficiency, e.g., screw slippage. PEG with a weight average molar mass of less than 1,000,000, preferably less than 50,000 and more preferably less than 25,000, g/mol is a preferred agent for use in this masterbatch procedure, especially with polyethylene, particularly with LDPE.

The water tree-resistant agents of the present invention can be used in any amount that reduces water treeing of the polymer under end-use conditions. These agents can be used in amounts of at least 0.0001, preferably at least 0.01, more preferably at least 0.1 and even more preferably at least 0.4, wt % based on the weight of the composition. The only limit on the maximum amount of tree-resistant agent in the composition is that imposed by economics and practicality (e.g., diminishing returns), but typically a general maximum comprises less than 20, preferably less than 3 and more preferably less than 2 wt % of the composition.

Other Additives

The composition may contain additional additives including but not limited to antioxidants, curing agents, cross linking co-agents, boosters and retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives can be used in amounts ranging from less than about 0.01 to more than about 10 wt % based on the weight of the composition.

Examples of antioxidants are as follows, but are not limited to: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis (2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl) diphenylamine, diphenyl-p-phenylenediamine, mixed di-aryl-p-phenylenediamines, and other hindered amine antidegradants or stabilizers. Antioxidants can be used in amounts of about 0.1 to about 5 wt % based on the weight of the composition.

Examples of curing agents are as follows: dicumyl peroxide; bis(alpha-t-butyl-peroxyisopropypbenzene; isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy) 3,3,5-trimethylcyclohexane; isopropylcumyl cumylperoxide; di(isopropylcumyl) peroxide; or mixtures thereof. Peroxide curing agents can be used in amounts of about 0.1 to 5 wt % based on the weight of the composition. Various other known curing co-agents, boosters, and retarders, can be used, such as triallyl isocyanurate; ethyoxylated bisphenol A dimethacrylate; α-methyl styrene dimer; and other co-agents described in U.S. Pat. Nos. 5,346,961 and 4,018,852.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or n,n'-ethylenebisstearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of about 0.05 to about 5 wt % based on the weight of the composition.

Examples of fillers include but are not limited to days, precipitated silica and silicates, fumed silica calcium carbonate, ground minerals, and carbon blacks with arithmetic mean particle sizes larger than 15 nanometers. Fillers can be used in amounts ranging from less than about 0.01 to more than about 50 wt % based on the weight of the composition.

Dosing Method

In this embodiment of the invention, solid polymer, typically in the form of pellets but other forms are possible including but not limited to granules and flakes, are sprayed or otherwise contacted with the low molecular weight, water tree-resistant agent before the polymer is fed to an extrusion apparatus for extrusion as a sheath about a wire or optical fiber. If the polymer is in the form of a pellet, then the pellet, e.g., an HPLDPE pellet, can be of any size and configuration, and is typically made using conventional pellet technology. Typically the pellets are heated to a temperature above room temperature, e.g., 25-100° C., and sprayed with liquid tree-resistant agent. The agent is either liquid at room temperature, or is heated to a temperature at which it is sufficiently liquid to be sprayed upon the pellets. The pellets are typically agitated, e.g., stirred, tumbled, etc., during the spraying process to ensure uniform application of the agent to the pellets. The agent can be applied all at once or incrementally, e.g., in a series of separate spraying operations. The agent can be applied alone or in combination with one or more other additives, or the one or more additives can be applied before or after the water tree-resistant agent is applied.

Once sprayed or otherwise contacted with the agent, the solid polymer can be used wet or dry depending upon the extrusion equipment. Smooth-barrel extrusion equipment operates more efficiently if the solid polymer is dry, while grooved-barrel extrusion equipment works well with either wet or dry solid polymer.

Typically and preferably, the solid polymer (in the form of pellets) is allowed to stand until the agent is absorbed into the pellet. Usually the pellets are sprayed with an amount of agent less than the absorption capacity of the pellet for the agent, although some amount of agent may dry on the surface of the pellet before it can be absorbed into the pellet. The time for this absorption will vary with the reagents and conditions, e.g., temperature, pressure, air or gas flow over the pellets, etc., but absorption is usually considered complete when the pellets are dry to the touch. Typical absorption times are in the range of 10 to 480 minutes. The agent can be contacted with the pellets before, after or simultaneously with the application of other additives, e.g., antioxidants, crosslinking agents, etc., to the pellet.

The sprayed solid polymer, wet or dry but preferably dry, is then fed to an extrusion apparatus in which it is melted, blended with any other components of the sheath composition, and then extruded as a sheath over a wire, optic fiber and/or another sheath. Crosslinking of the polymer typically commences within the extruder equipment, but is often completed after extrusion.

Alternatively, a masterbatch may be added that contains a water tree-resistant agent in which the agent used to make the masterbatch can be in any physical form and of a molecular weight that is sufficiently high to reduce "sweatout" to the pellet surface. Generally, molecular weights in excess of 1500 are sufficient in those instances in which one or more of the polymers is a polyethylene, particularly LIVE, LLDPE, VLDPE or EEA.

Direct Injection Method

In this embodiment of the invention, the polymer and water tree-resistant agent are contacted with one another within the extruder apparatus. Typically, the solid polymer in the form of pellets is fed to the extruder and the agent in liquid is dripped, sprayed or otherwise applied to the solid polymer before the polymer is melted. This contacting usually takes place in the feed throat of the extruder apparatus. The polymer and agent are then melt blended within the extruder under the action of the extruder mixing equipment, e.g., screws, and at an elevated temperature. Alternatively, the solid polymer is first melted within the extruder apparatus, and then the liquid tree-resistant agent is injected into the apparatus, e.g., it is sprayed onto the molten polymer mass before it is extruded over a sheathed or unsheathed wire or optic fiber. The application of the agent to the polymer can occur in one or multiple stages, alone or in combination with the application of the additives, and at various points within the extruder apparatus.

Compounding of a cable insulation material can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of a semiconducting material such as viscosity, volume resistivity, and extruded surface smoothness.

A cable containing an insulation layer comprising a composition of a polyolefin polymer and a water tree-resistant agent can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating where the polymeric insulation is crosslinked after extrusion, the cable often passes immediately into a heated vulcanization zone downstream of the extrusion die. The heated cure zone can be maintained at a temperature in the range of about 200 to about 350 C, preferably in the range of about 170 to about 250 C. The heated zone can be heated by pressurized steam, or inductively heated pressurized nitrogen gas.

Although the invention has been described in considerable detail by the preceding specification, this detail is for the purpose of illustration and is not to be construed as a limitation upon the following appended claims. All cited reports, references, U.S. patents, allowed U.S. patent applications and U.S. Patent Application Publications are incorporated herein by reference.

What is claimed is:

1. A method for preparing a water tree-resistant cable sheath, the method comprising the steps of:

A. Contacting a water tree-resistant agent with a solid polyethylene polymer outside an extrusion apparatus and at a temperature between about 25° C. and 100° C., wherein the water tree-resistant agent comprises a polyethylene glycol selected from the group consisting of a polyethylene glycol having a weight average molar mass of less than 700 g/mol and which is liquid at 23° C., a polyethylene glycol having a weight average molar mass of from 700 g/mol to 2,000 g/mol which is heated to at or above the melting point of the polyethylene glycol so that the polyethylene glycol is in liquid form during the contacting, and combinations thereof, B. Allowing the solid polyethylene polymer to stand until the agent is absorbed into the solid polymer, C. Transferring the solid polyethylene polymer with the absorbed agent to an extrusion apparatus, and D. Extruding the polyethylene polymer with absorbed agent onto a sheathed or unsheathed wire or optic fiber.

2. The method of claim 1 in which the polyethylene polymer is in the form of a pellet, granule or powder.

3. The method of claim 2 in which the water tree-resistant agent is a polyethylene glycol having weight average mass of less than 700 g/mol and is liquid at 23° C.

4. The method of claim 3 in which the polymer is a selected from the group consisting of high pressure low density polyethylene (HPLDPE), high density polyethylene (HDPE), linear low density polyethylene, metallocene LLDPE and constrained geometry catalyst (CGC) ethylene polymers.

5. A method for preparing a water tree-resistant cable sheath, the method comprising the steps of:

A. Feeding a solid polyethylene polymer to an extrusion apparatus comprising an upstream end, a downstream end and at least one extruder barrel with at least one screw disposed between the upstream end and the downstream end, B. Injecting, before the at least one extruder barrel, a liquid polyethylene glycol having a weight average molecular mass of less than 700 into the extrusion apparatus before the polymer has entered the at least one extruder barrel so as to contact the polymer with a liquid water tree-resistant agent before the solid polymer is melted, C. Blending the polymer and the agent within the extrusion apparatus, and D. Extruding the polymer with blended agent onto a sheathed or unsheathed wire or optic fiber.

6. The method of claim 5 in which the polymer is in the form of a pellet, granule or powder.

7. The method of claim 6 in which the water tree-resistant agent is liquid at 25° C.

8. The method of claim 1 wherein the agent is allowed to stand for 10 to 480 minutes.

9. The method of claim 1 wherein the water tree-resistant agent is a polyethylene glycol having a weight average molar mass of from 700 g/mol to 2,000 g/mol.

10. The method of claim 1 wherein the polyethylene glycol is vinyl end-capped polyethylene glycol.

11. The method of claim 5 wherein the polyethylene glycol is vinyl end-capped polyethylene glycol.

12. The method of claim 1 wherein the contacting occurs at a temperature between about 25° C. and 70° C.

13. The method of claim 1 wherein the step contacting the liquid water tree-resistant agent with the solid polymer includes agitating the solid polymer.

14. The method of claim 1 wherein the water tree-resistant agent is a eutectic mixture of the liquid polyethylene glycol having a weight average molar mass of less than 700 and a polyethylene glycol having a weight average molar mass of from greater than 2,000 to no greater than 50,000.

15. The method of claim 1 wherein the step of allowing the solid polyethylene polymer to stand until the agent is absorbed into the solid polymer comprises allowing the solid polyethylene polymer to stand until the agent is absorbed into the solid polymer and the solid polymer is dry.

16. The method of claim 1 wherein the step of transferring the solid polyethylene polymer with the absorbed agent to an extrusion apparatus comprises transferring the solid polyethylene polymer with the absorbed agent to an extrusion apparatus while the solid polymer is wet.

17. The method of claim 5 wherein the extrusion apparatus is a single screw extrusion apparatus.

18. The method of claim 5 wherein the extrusion apparatus includes a feed throat at the upstream end and the step of contacting the polymer with a liquid water tree-resistant agent, comprising a polyethylene glycol having a weight average molecular mass of less than 700 occurs in the feed throat.

* * * * *